United States Patent [19]

Bray

[11] 4,225,913
[45] Sep. 30, 1980

[54] SELF-REFERENCING POWER CONVERTER

[75] Inventor: William E. Bray, Houston, Tex.

[73] Assignee: Texas Instruments Incorporated, Dallas, Tex.

[21] Appl. No.: 944,036

[22] Filed: Sep. 19, 1978

[51] Int. Cl.³ .......................................... H02P 13/20
[52] U.S. Cl. ...................................... 363/97; 323/21; 323/DIG. 1
[58] Field of Search .................................. 363/79–80, 363/97, 124, 18–21; 323/17, 21, DIG. 1

[56] References Cited

U.S. PATENT DOCUMENTS

| | | | |
|---|---|---|---|
| 3,916,281 | 10/1975 | Owen | 323/DIG. 1 |
| 4,001,663 | 1/1977 | Bray | 363/37 |
| 4,037,271 | 7/1977 | Keller | 363/80 X |
| 4,092,709 | 5/1978 | Voigt et al. | 363/91 X |
| 4,130,862 | 12/1978 | Holt | 363/21 X |
| 4,135,234 | 1/1979 | Forge | 363/97 X |
| 4,146,832 | 3/1979 | McConnell | 363/19 X |

Primary Examiner—J. D. Miller
Assistant Examiner—Peter S. Wong
Attorney, Agent, or Firm—Thomas G. Devine; Leo N. Heiting; Melvin S. Sharp

[57] ABSTRACT

A self-referencing power converter operates at a high frequency with a low loss, light weight ferrite core transformer. The transformer primary is selectively connected across a DC source of rectified AC power to provide energy storage followed by a predetermined time period of disconnect to provide energy transfer by way of transformer flyback. The energy storage cycle begins when the voltage across the primary winding of the transformer does not exceed a predetermined value and the predetermined time period of disconnect has ended. A current sensing circuit senses the current flowing through the primary winding, permitting such current to flow until a power reference is reached. A comparison circuit in the transformer secondary compares a reference voltage with an operating voltage and returns any error voltage to the primary circuit, the error voltage then being used to set the power reference.

13 Claims, 3 Drawing Figures

SELF-REFERENCING POWER CONVERTER

BACKGROUND OF THE INVENTION

1. Field of the Invention

This invention pertains to power supplies for connection to readily available power sources such as 60 Hz, 115 or 230 volts. More specifically, it relates to a self-referencing power converter which senses the current though the primary winding of the power transformer and uses that current ramp for pulse width modulation.

2. Description of the Prior Art

Power supplies typically utilize laminated cores in transformers used to obtain the working voltage or voltages desired. This is accomplished by directly transforming the 60 Hz input voltage. Power supplies utilizing such transformers can be designed to operate quite satisfactorily, but have the disadvantage of large bulk and weight which cannot readily be tolerated for some applications. Associated circuitry, such as filter capacitors, also must be large. To reduce size and weight, unregulated secondary inverters have been provided to supply power. These devices are difficult to regulate. Secondary regulators are typically used, causing a reduction in circuit efficiency and a more expensive power supply.

The switching regulator power supply provides high efficiency and low cost. It commonly incorporates a transformer wound on a ferrite core wherein an energy storage period is used to store energy in the transformer primary and an energy transfer period is used to transfer energy from the primary to the secondary of the transformer when the primary winding is opened. A basic switching regulator power supply monitors electrical parameters in the primary circuit, having an AC coupling only through the transformer to the secondary circuit. Often, a small 60 Hz transformer must be used to assure that the power supply will work upon application of line voltage.

A more advanced switching regulator power supply utilizes a transformer coupled feedback circuit from the secondary circuit to the primary circuit. This permits monitoring secondary power parameters and adjusting the energy storage cycle accordingly, to a degree of accuracy not achievable when the primary circuit only is monitored as is the case of the basic switching regulator power supply.

An example of a sophisticated switching regulator power supply which uses a pulse width modulation technique is described and claimed in U.S. Pat. No. 4,001,663—"Switching Regulator Power Supply". This patent describes the use of optical coupling devices for coupling error signals from the secondary circuit back to the primary circuit where the error signals are utilized to vary the time of the energy storage and energy transfer cycles.

Another type of switching regulator power supply is that described in U.S. Pat. No. 4,092,709 "Multiple Output Self-Oscillating Converter Regulator Power Supply." This patent teaches the varying of the frequency of oscillation of the switching regulator as determined by transformer coupled secondary error signals.

The converter herein described and claimed utilizes a technique of monitoring the current flowing through the primary winding of the power transformer during the energy storage cycle. When that current reaches a preset power reference, a blocking oscillator power switch opens, ending the energy storage cycle. The power reference is set by an error signal from the transformer secondary circuit which is optically coupled to the primary.

BRIEF SUMMARY OF THE INVENTION

A self-referencing power converter utilizes a single power transformer wound on a ferrite core. The power supply is adapted to be connected to a DC source of rectified, readily available AC power such as 60 Hz at 115 or 230 volts. The transformer primary winding is selectively connected across the rectified AC source to provide energy storage. The blocking oscillator power switch is used to provide drive and continuity through the primary winding to each side of the AC rectified source. An energy transfer cycle follows in which the power switch is abruptly opened, permitting current to flow in the other direction in the secondary winding when the field in the primary winding collapses. This is referred to as transformer flyback and at this time, an energy transfer cycle occurs within a predetermined time period. The secondary winding or windings contain rectifier diodes which permit current to flow in the desired direction only when the transformer flyback occurs. The total time that the power switch is maintained open is constant but the energy transfer cycle varies.

The rising current flowing in the primary winding during the energy storage cycle is monitored by a current sensing circuit which is connected to a control circuit for controlling the blocking oscillator power switch. When the current sensing circuit determines that a preset power reference has been reached, the control circuit is activated, opening the power switch.

One secondary winding is monitored for secondary voltage amplitude. A comparison with a reference voltage is made and any error signal is transmitted as a voltage level back to the primary through an optical coupling device to ultimately effectively raise or lower the power reference.

The principal object of this invention is to provide a light weight, compact, and reliable power supply for connection across a DC source of rectified, readily available AC power.

Another object of this invention is to provide a pulse width modulated power converter that utilizes the current ramp through the primary winding as a reference to control pulse width.

Still another object of this invention is to provide a self-referencing power converter that has DC coupling between the primary and secondary circuits.

Another object is to provide a self-referencing power converter that utilizes a secondary error signal for adjusting a primary power reference.

A further object of this invention is to provide a self-referencing power converter that has a minimum of circuitry.

These and other objects will be made evident in the detailed description that follows.

DETAILED DESCRIPTION OF THE INVENTION

Figure 1:
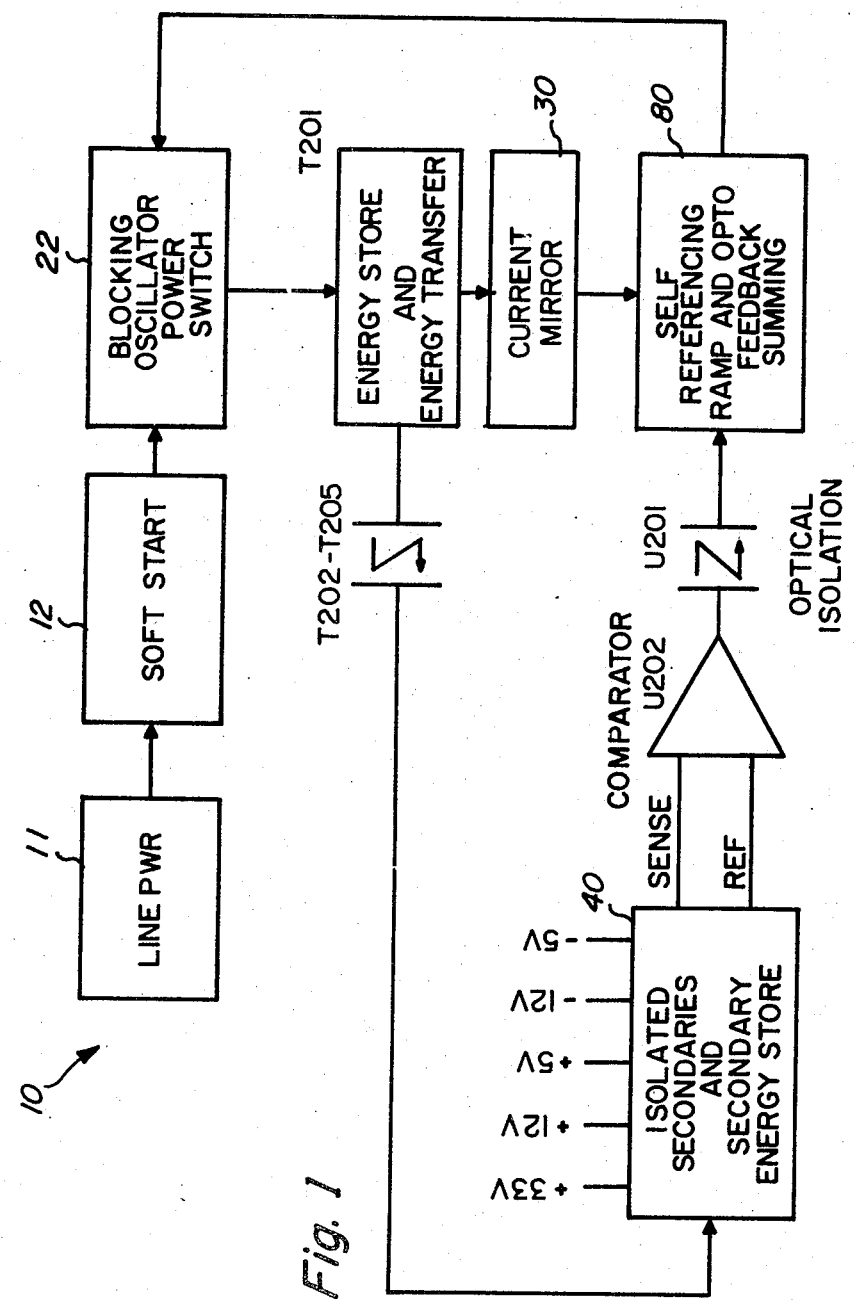
FIG. 1 is a block diagram of the power converter.

FIG. 1 illustrates the self-referencing power converter 10 in block form. Line power 11 of 115 volts AC or 230 volts AC is shown as an input to the soft start circuit 12 which provides unregulated DC energy to the blocking oscillator power switch 22 which is connected to the primary T201 of the power transformer for the energy store and energy transfer cycles. The output of the primary T201 constitutes the secondary windings 202-T205 which form transformer isolation 40 providing output voltages of +33 v, +12 v, +5 v, −12 v and −5 v. One of the isolated secondary windings is connected to comparator U202 whose output is optically coupled through optocoupler U201 which is an input for self referencing ramp and opto feedback summing point 80. The level translator circuit 30 provides the self-referencing ramp input to point 80. The self referencing ramp is terminated at a power reference, irrespective of the slope of the ramp, such power reference being established by the addition of the opto feedback.

Figure 2:
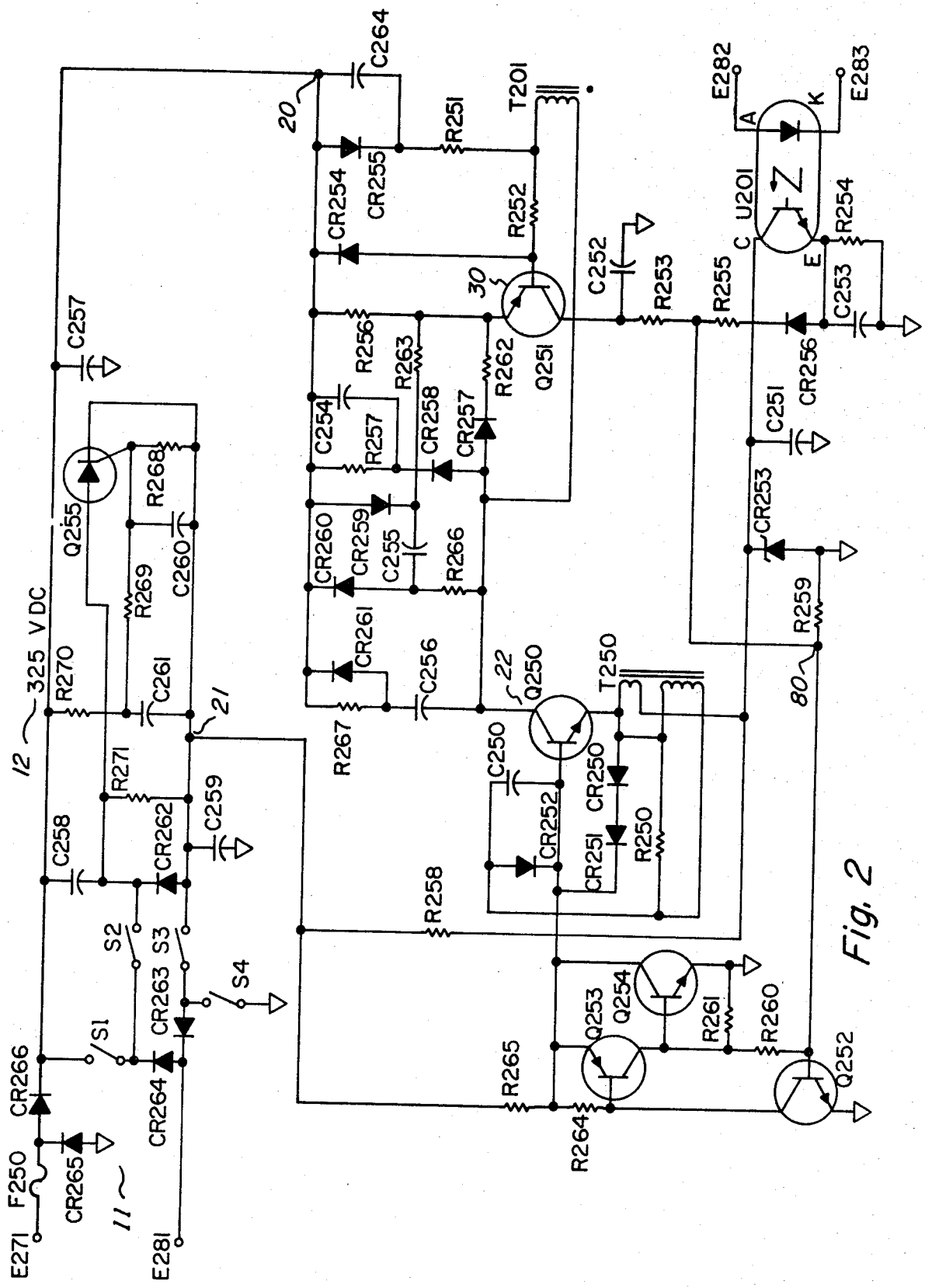
FIG. 2 is a schematic diagram of the primary circuit of the power converter.

FIG. 2 illustrates in detail the primary portion of the self-referencing power converter 10. The line power 11 of 115 volts AC or 230 volts AC is impressed across terminals E271 and E281. The line from terminal E271 passes through fuse F250 to the anode of diode CR266 and to the cathode of diode CR265 whose anode is connected to ground return. The line from terminal E281 is connected to the anode of diode CR264 and to the cathode of diode CR263. The cathode of diode CR266 (point 20) is connected to one terminal of switch 81, the other terminal being connected to the cathode of diode CR264 and also to one terminal of switch S2. The other terminal of switch S2 is connected to the cathode of diode CR262, to one side of capacitor C258 and to one end of resistor R271. The anode of diode CR263 is connected to one side of switch S3 and to one side of switch S4. The other side of S3 is connected to the anode of diode CR262, to the other end of resistor R271 and to one side of capacitor C259 whose other side is connected to the ground return. The other terminal of switch S4 is connected to the ground return. Point 20 is also connected to the other side of capacitor C258. The circuitry above described forms a voltage doubling network for providing a DC power reservoir wherein capacitors C258 and C259 are charged to the value of the doubled voltage.

Silicon controlled rectifier Q255 has its anode connected to the cathode of diode CR262 and its cathode connected to the anode of diode CR262. The control element of SCR Q255 is connected through resistor R268 to point 21 to one side of capacitor C260, whose other side is tied to point 21 and through resistor R269 to one side of capacitor C261 whose other side is tied to point 21. The cathode of SCR Q255 is connected to point 21. The one side of capacitor C261 is connected through resistor R270 to point 20, a point at which 325 volts DC, in this preferred embodiment, is provided.

SCR Q255 limits the initial turn-on surge current. The time constant determined by resistors R269, R270 and R271, together with capacitor C261 limits the surge current until SCR Q255 turns on. Diode CR262 keeps the SCR from becoming reverse-biased by more than one volt due to any heavy load currents. SCR Q255 and its associated circuitry form soft start circuit 12.

Resistor R267 is connected at one end to point 20 and its other end is connected to one side of capacitor C256. The other end of resistor R267 is also connected to the anode of diode CR261 whose cathode is connected to point 20. The other side of capacitor C256 is connected to the collector of blocking oscillator power switch transistor Q250. Capacitor C256, resistor R267 and diode CR261 form a snubber circuit which ensures that the transistor Q250 is turned off before reaching a critical voltage.

The collector of transistor Q250 is also connected through resistor R266 to the anode of diode CR260 whose cathode is connected to point 20. The anode of diode CR259 is also connected to point 20. The anode of diode CR260 is connected to one side of capacitor C255 whose other side is connected to the cathode of diode CR259. The collector of transistor Q250 is connected to the cathode of diode CR258 whose anode is connected through resistor R257 to point 20, to which is also connected one terminal of capacitor C254 whose other terminal is connected to the cathode of diode CR258. The cathode of diode CR259 is connected through resistor R263 to one end of resistor R256 whose other end is connected to point 20, to which is also connected the cathode of diode CR254 whose anode is connected to the base of current mirror transistor Q251. The collector of transistor Q250 is connected also to the anode of diode CR257 whose cathode is connected through resistor R262 to the emitter of transistor Q251. Capacitor C257 has one side connected to point 20 and the other side connected to the ground return.

The combination of resistor R257, capacitor C254 and diode CR258 forms another snubber circuit which prevents any excess overshoot on the collector of transistor Q250 when that transistor is turned off.

The primary winding T201 of the power transformer has one side connected to the collector of transistor Q250 and the other side connected through R251 to the cathode of diode CR255 whose anode is connected to point 20 to which is connected one side of capacitor C264 whose other side is connected back to the cathode of diode CR255. The other end of winding T201 is also connected through resistor R252 to the base of current mirror transistor Q251. The collector of transistor Q251 is connected through resistor R253 to point 80 and to one side of capacitor C252 whose other side is connected to the ground return. Point 80 is connected through resistor R255 to the cathode of diode CR256 whose anode is connected to the emitter of the light sensitive transistor of opto coupler U201, and through resistor R254 to the ground return as well as to one side of capacitor C253 whose other side is connected to the ground return.

The collector of the light responsive transistor of opto coupler U201 is connected to one side of capacitor C251 whose other side is connected to the ground return and to the cathode of Zener diode CR253 whose anode is connected to the ground return. Capacitor C251 not only provides reverse biasing for transistor Q250, but also supplies voltage for opto coupler U201. The collector of opto coupler U201 is also connected through resistor R258 to point 21. Point 21 is connected through resistor R265 to the emitter of transistor Q253. The base of transistor Q253 is connected through resistor R264 back to its emitter and to the collector of transistor Q252. The collector of transistor Q253 is connected through resistor R260 to the base of transistor Q252 whose emitter is connected to the ground return. The base of transistor Q252 is also connected to point 80 and to resistor R259. The collector of transistor Q253 is also connected to the base of transistor Q254 whose emitter is connected to the ground return and also back to its base through resistor R261. The collector of transistor Q254 is connected to the emitter of transistor Q253.

Transformer T250 maintains regeneration for transistor Q250. The first winding of transformer T250 has one end connected to the emitter of transistor Q250 and the other end connected to the collector of opto coupler U201. The second winding of transformer T250 has one end connected to the emitter of transistor Q250 and the other end connected to one side of capacitor C250 whose other side is connected to the base of transistor Q250. Connected across the second winding of transformer T250 is resistor R250. The anode of diode CR250 is connected to the emitter of transistor Q250 and its cathode is connected to the anode of diode CR251 whose cathode is connected to the base of transistor Q250. The cathode of diode CR251 is also connected to the cathode of diode CR252 whose anode is connected to the other end of the second winding of transformer T250. The cathode of diode CR252 is also connected to the collector of transistor Q254. Diodes CR250 and CR251 keep the emitter-to-base reverse bias of transistor Q250 at less than 2 volts, maximizing its inductive energy handling ability while ensuring against a possible emitter-to-base breakdown.

Transformer T250, in this preferred embodiment, has a turns ratio of 5 to 1 and therefore transistor Q250 has a forced beta of 5.

The combination of transistors Q252, Q253 and Q254, along with the associated resistors, forms the trigger circuit for controlling the conduction of the blocking oscillator power switch transistor Q250.

Figure 3:
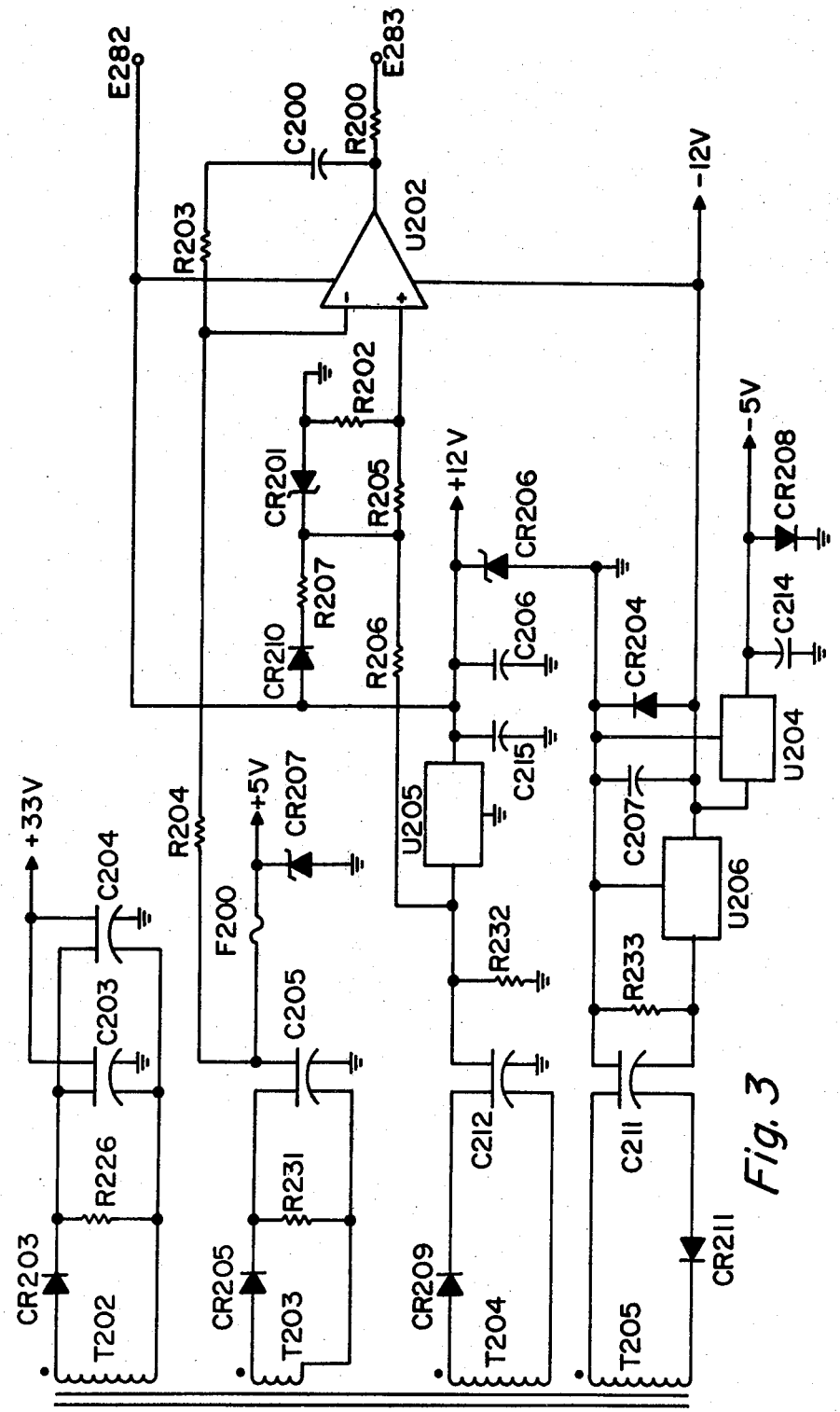
FIG. 3 is a schematic diagram of the secondary circuit of the power converter.

Refer now to FIG. 3 for a detailed description of the secondary circuit of the power converter. The secondary windings T202, T203, T204 and T205 of the power transformer are shown. One end of each of windings T202, T203 and T204 are connected to the anodes of diodes CR203, CR205 and CR209, respectively. The cathode of diode CR203 is connected through resistor R226 to the other side of winding T202. The cathode of diode CR205 is connected through resistor R231 to the other side of winding T203. The cathode of diode CR209 is connected to one positive terminal of four terminal capacitor C212. One negative terminal of capacitor C212 is connected to the other side of winding T204. One side of winding T205 is connected to one positive terminal of four terminal capacitor C211, one negative terminal being connected to the anode of diode CR211 whose cathode is connected to the other side of winding T205. The cathode of diode CR203 is also connected to one positive terminal of four terminal capacitor C203 and to one positive terminal of four terminal capacitor C204. One negative terminal of capacitor C203 is connected to one negative terminal of capacitor C204 which are both connected to the other side of winding T202. The other positive terminal of capacitor C203 provides a +33 volt output as does the other positive terminal of capacitor C204. The other negative terminals of both capacitors C203 and C204 are grounded.

The cathode of diode CR205 is also connected to one positive terminal of four terminal capacitor C205 whose other positive terminal is connected through fuse F200 to the cathode of Zener diode CR207 where a +5 volt output is provided. The anode of Zener diode CR207 is grounded. The other positive terminal of capacitor C205 is also connected through resistor R204 to the negative terminal of comparator U202. One negative terminal of capacitor C205 is connected to the other side of winding T203 and the other negative terminal is connected to ground.

The other positive terminal of capacitor C212 is connected to the input of three terminal voltage regulator U205 whose output provides +12 volts and is connected as an operational voltage to comparator U202 and to the cathode of Zener diode CR206 whose anode is grounded. This +12 volt output is also connected to each of the terminals of capacitors C215 and C207 whose other terminals are grounded. The third terminal of voltage regulator U205 is grounded. The input to voltage regulator U205 is grounded through resistor R232 and also connects through resistor R206 to the anode of Zener diode CR201 whose cathode is grounded. The output of regulator U205 is also connected to the anode of diode CR210 whose cathode is connected through resistor R207 to the cathode of Zener diode CR201. The cathode of Zener diode CR201 is also connected through resistor R205 to the other input of comparator U202. The other input of comparator U202 is also connected through resistor R202 to ground.

Voltage regulator U205 may be a type LM340-12T which is found described on Page 1-58 of "Linear Data Book National"—Copyright 1976, National Semiconductor Corp.

Also described at Page 1-57 of that publication is type LM320 series three terminal negative regulator which fully describes regulators U204 and U206 of this invention, mentioned below.

Also described in detail in the above-identified publication is comparator U202 which is a type LM741 Operational Amplifier found at Page 3-191.

The other positive terminal of capacitor C211 is grounded while its other negative terminal is grounded through resistor R233 and serves as an input of three terminal regulator U206 whose output provides −12 volts. Its third terminal is grounded. The −12 volt output of regulator U206 serves as an input to regulator U204 whose output provides −5 volts and whose third terminal, as that of regulator U206, is grounded. The output of regulator U204 is connected to one terminal of capacitor C214 whose other terminal is grounded, and to the anode of diode CR208 whose cathode is grounded. The output of regulator U206 is also connected to one terminal of capacitor C206 whose other terminal is grounded and to the anode of diode CR204 whose cathode is grounded. This −12 volts is used as a voltage input to comparator U202.

Comparator U202 has an output which is supplied through resistor R200 at terminal E283 and is also connected to one side of capacitor C200 the other side of which is connected through resistor R203 to the first input of comparator U202. Terminal E282 is connected to the output of regulator U205. Terminal E282 is shown connected to the anode of the light emitting diode portion of opto coupler U201 (FIG. 2) and terminal E283 is shown connected to the cathode.

PREFERRED MODE OF OPERATION

Refer to both FIGS. 2 and 3. With an AC input voltage of 115 volts applied across terminals E271 and E281 and switches S2 and S3 closed (switches S1 and S4 closed for 230 volts input) a DC voltage is developed through the soft start circuit 12 appearing across point 20 and the ground return as 325 volts DC in this preferred embodiment. 325 volts DC will also be present on the collector of transistor Q250 through primary winding T201 and resistor R251. The voltage developed at point 21 is 162 volts DC which is provided to the base of transistor Q250 through resistor R265. With these voltages present, transistor Q250 begins its conduction and is regeneratively held in conduction by the action of transformer T250.

As the current ramp builds up through primary T201, it is reflected by current mirror transistor Q251 by essentially monitoring the current flowing through resistor R251. This current ramp is developed at point 80 in the form of a voltage input on the base of transistor Q252. When the voltage rises to +0.6 volts, transistor Q252 is turned on, turning on transistor Q253 which, in turn, turns on transistor Q254. When transistor Q254 is turned on, the base voltage of transistor Q250 drops, turning off transistor Q250. Reverse base current flows through transistor Q250 from capacitor C251 through transformer T250, through diode CR252, and into capacitor C250, returning through transistor Q254. At this point, the first energy storage cycle ends and the energy transfer cycle begins.

Primary winding T201 attempts to maintain current flow with its collapsing field, and commences flyback. The rate of change of flyback is limited by a snubber circuit made up of capacitor C256, resistor R267 and diode CR261. As mentioned earlier, this snubber circuit ensures that transistor Q250 is turned off before reaching its avalanche breakdown region. At this time, diode CR257 and resistor R262 provide current to the current mirror transistor Q251 to maintain transistor Q252 in conduction. Additional current is conducted through the current mirror transistor Q251 by capacitor C255 charging through resistors R256 and R263. This RC network forms a timing means for positively maintaining the conduction of transistor Q252 which then will not permit the turning on of the blocking oscillator power switch transistor Q250. The snubber circuit comprised of diode CR258, resistor R257 and capacitor C254, as mentioned above, prevents an extreme flyback over-shoot voltage. The transistor Q251 then, cannot be turned off until the RC time constant of capacitor C255, R263 and R256 has expired. Further, because of the voltage developed across resistor R262, current mirror transistor Q251 cannot be turned off until the flyback voltage has dropped to a predetermined value, in this preferred embodiment, 50 volts over the line voltage of 325 volts DC.

When the time-out has occurred and the flyback voltage has dropped below an excess of 50 volts over the line voltage, Q251 is turned off. This turns off the trigger circuit comprised of transistors Q252, Q253 and Q254. When those transistors are turned off, transistor Q250 is again turned on and an energy storage cycle begins.

Up to this point, the effect of the secondary circuit has not been discussed. Assume that transistor Q250 is again turned off as described above. Now with reference to the secondary circuit as shown in FIG. 3, the flyback voltage induces current to flow in the secondary windings because of the disposition of the diodes CR203, CR205, CR209, and CR211 in each of windings T202–T205 respectively. Secondary voltages are then produced by each of the windings.

Special attention should be directed to the circuit of secondary winding T203 because it is monitored by comparator U202. The positive input of U202 is a reference voltage which is supplied by the network of components described earlier.

Having established that reference voltage, any deviation from the reference will cause an output from comparator U202 at terminal E283. This will cause the light emitter section of opto-coupler U201 to emit light which is coupled into the light responsive transistor section of opto-coupler U201 providing a voltage across R255 to sum with the voltage across R253 at point 80, such summed voltage being developed across resistor R259. The additional voltage from opto-coupler U201 shifts the operational range of transistor Q252 which had been from 0 volts to +0.6 volts. For example, the additional voltage may be +0.2 volts which then would cause an operational range of Q252 to be only 0.4 volts. In this manner, a power reference is set. Then any change in the input line voltage across terminals E271 and E281 results in a different slope of the ramp current through primary T201 as reflected by current mirror transistor Q251 through resistor R253 and will still result in a cutoff of transistor Q250 when 0.6 volts is reached between the base and the emitter of transistor Q252, turning that transistor on. The slope of the current ramp as determined by the input voltage has no bearing on the power reference setting. That is, it will shut off when 0.6 volts is reached at transistor Q252. Only the time that it takes to reach the cutoff value varies. The cutoff power reference varies by the amount of the error signal which is fed back through output coupler U201.

This power converter utilizes the actual current ramp built up through the power transformer primary winding T201 and adds to that ramp the error signal from a secondary winding, thereby changing the power reference setting.

This ultimate result can be realized with various combinations of components and any number of error signals without departing from the scope of this invention.

What is claimed is:

1. A self-referencing power converter for connection to a DC source of power, with a regulation cycle having an energy storage cycle and an energy transfer cycle, comprising:
   (a) a transformer having a secondary winding, and a primary winding that is selectively connected across the DC source during the energy storage cycle to permit current flow in one direction, and selectively disconnected during the energy transfer cycle to permit current flow in the other direction in the secondary winding;
   (b) power switching means connected to the DC source and to the primary winding, and having control means for permitting the switching means to close, thereby connecting the primary winding across the DC source, and for permitting the switching means to open, thereby disconnecting the primary winding from the DC source;
   (c) timing means connected to the control means to permit the switching means to close after it has been open a predetermined period of time;
   (d) current sensing means connected to the primary winding for sensing current therethrough, and connected to the control means to permit the power switching means to open when the sensed current reaches the level of a preset power reference; and (e) power reference setting means connected to the current sensing means for effectively setting the power reference.

2. The converter of claim 1 wherein the power switching means comprises a transistor.

3. The converter of claim 1 wherein the control means comprises a trigger circuit.

4. The converter of claim 1 wherein the timing means comprises an RC circuit.

5. The converter of claim 1 wherein the current sensing means comprises an impedance connected between one terminal of the primary winding and one side of the DC source and a transistor having a control electrode connected between the impedance and the primary winding, a first main electrode connected to one side of the DC source and a second main electrode connected to the power reference setting means.

6. The converter of claim 1, wherein the power reference setting means comprises:

(e)
 (i) reference voltage means;
 (ii) comparison means having one input connected to the reference voltage means and another input electrically coupled to the secondary winding; and
 (iii) coupling means connected to the output of the comparison means and to the current sensing means.

7. The converter of claim 6 wherein the coupling means is an opto-coupler having a light emitting device connected to the output of the comparison means, and a light responsive device connected to the current sensing means.

8. The converter of claim 2 wherein the control means comprises a trigger circuit.

9. The converter of claim 8 wherein the timing means comprises an RC circuit.

10. The converter of claim 8 wherein the current sensing means comprises an impedance connected between one terminal of the primary winding and one side of the DC source and a transistor having a control electrode connected between the impedance and the primary winding, a first main electrode connected to one side of the DC source and a second main electrode connected to the power reference setting means.

11. The converter of claim 9 wherein the current sensing means comprises an impedance connected between one terminal of the primary winding and one side of the DC source and a transistor having a control electrode connected between the impedance and the primary winding, a first main electrode connected to one side of the DC source and a second main electrode connected to the power reference setting means.

12. The converter of claim 11 wherein the power reference setting means comprises:

(e)
 (i) reference voltage means;
 (ii) comparison means having one input connected to the reference voltage means and another input electrically coupled to the secondary winding; and
 (iii) coupling means connected to the output of the comparison means and to the current sensing means.

13. The converter of claim 12 wherein the coupling means is an opto-coupler having a light emitting device connected to the output of the comparison means, and a light responsive device connected to the current sensing means.

* * * * *